United States Patent [19]

Moore

[11] 4,167,812

[45] Sep. 18, 1979

[54] APPARATUS FOR CUTTING VEGETATION

[75] Inventor: Robert J. Moore, Fontana, Calif.

[73] Assignee: Weed Eater, Inc., Houston, Tex.

[21] Appl. No.: 809,744

[22] Filed: Jun. 24, 1977

[51] Int. Cl.² .................. A01D 35/26; A01G 3/06
[52] U.S. Cl. ................................. 30/276; 56/12.7
[58] Field of Search ............ 30/276, 347; 56/12.7, 56/295; 51/335

[56] References Cited

U.S. PATENT DOCUMENTS

| 2,709,323 | 5/1955 | Swan | 51/335 |
| 2,771,721 | 11/1956 | Reiman | 51/335 |
| 3,928,911 | 12/1975 | Pittinger | 30/276 |
| 4,024,635 | 5/1977 | Mizuno | 30/276 |
| 4,047,299 | 9/1977 | Bair | 30/347 |
| 4,134,204 | 1/1979 | Perdue | 30/276 |

Primary Examiner—Jimmy C. Peters

[57] ABSTRACT

An apparatus for cutting vegetation with a rotating head carrying a flexible, non-metallic cutting line extended radially into a cutting plane. An additional length of line is extended into the cutting plane by pushing the head against the ground and rotating the head. A glide ball on the head moves inwardly for releasing a spool carrying coiled cutting line to rotate a predetermined angular displacement in the head. After the cutting line length is extended, the spool is secured automatically against further rotation within the head.

In a preferred embodiment of the apparatus, the glide ball is pressed against the earth's surface with the head in a non-rotating condition. Then, the head is rotated for extending the cutting line from the head to the certain desired length. Then, the spool is secured automatically against rotation relative to the head.

5 Claims, 5 Drawing Figures

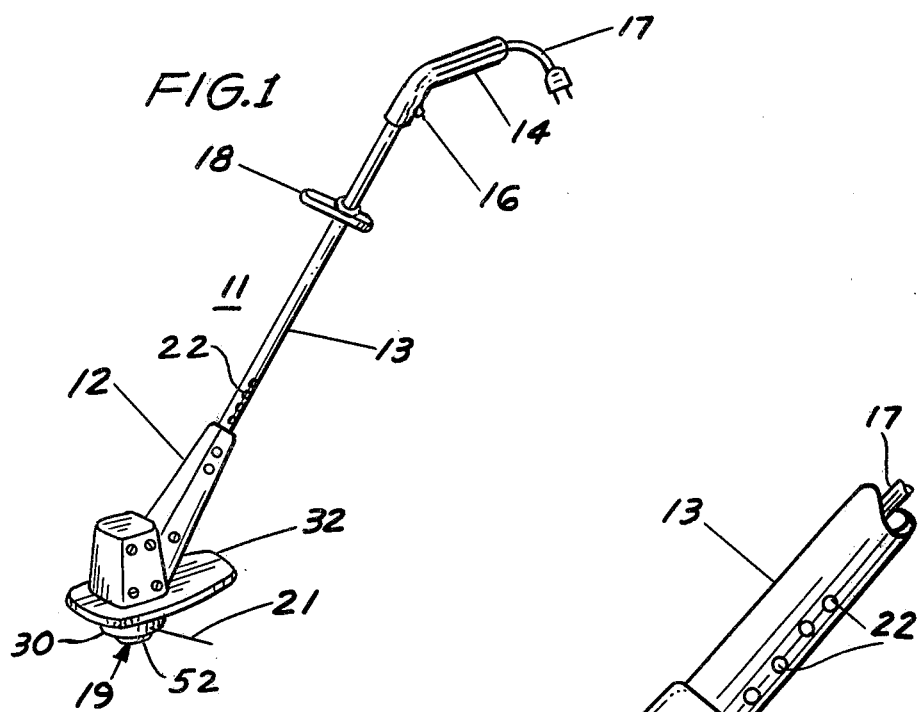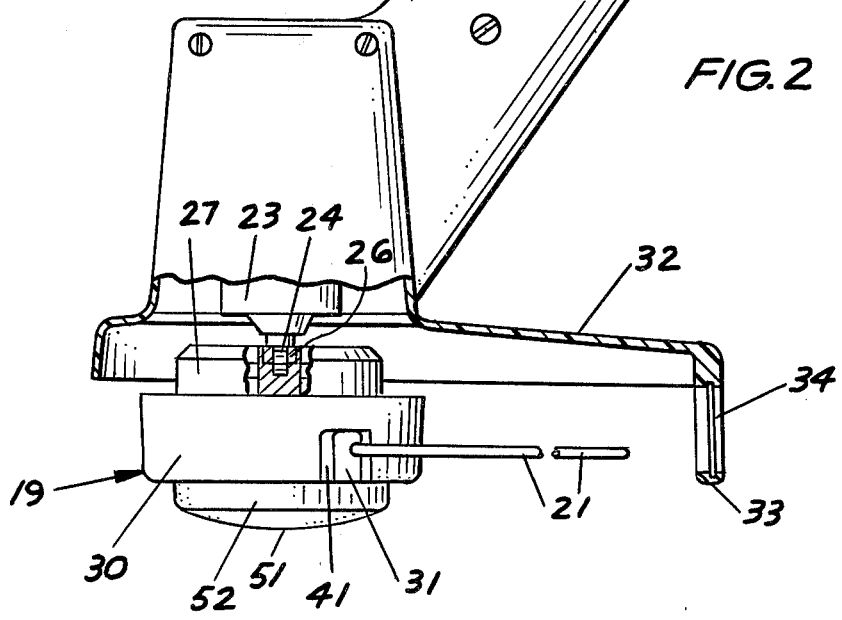

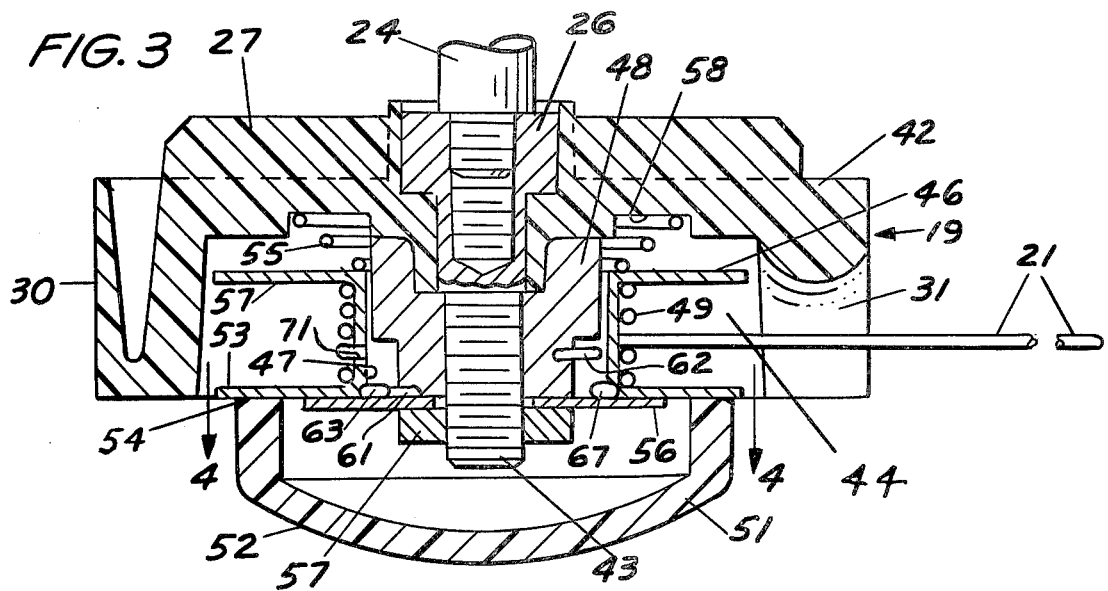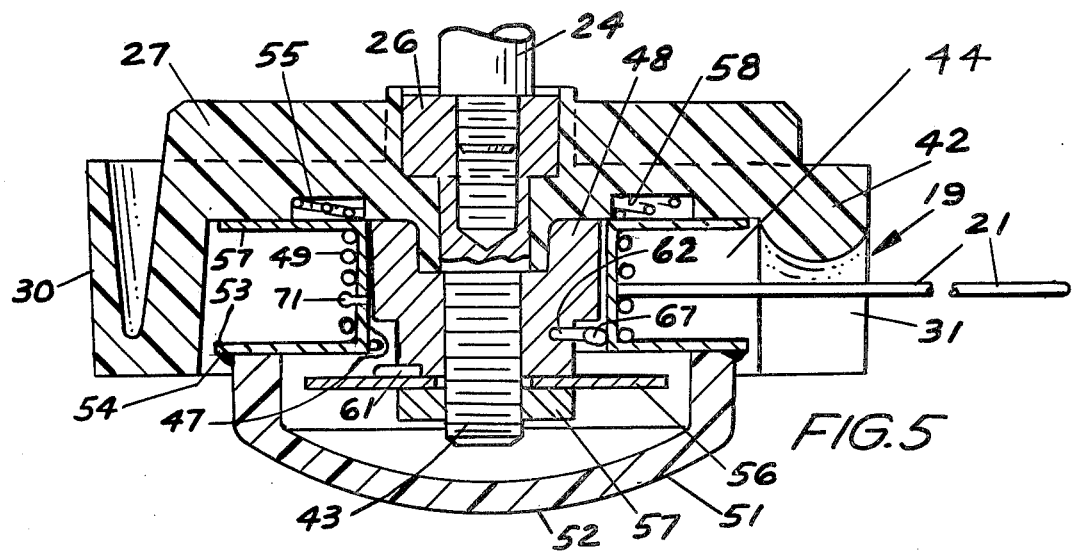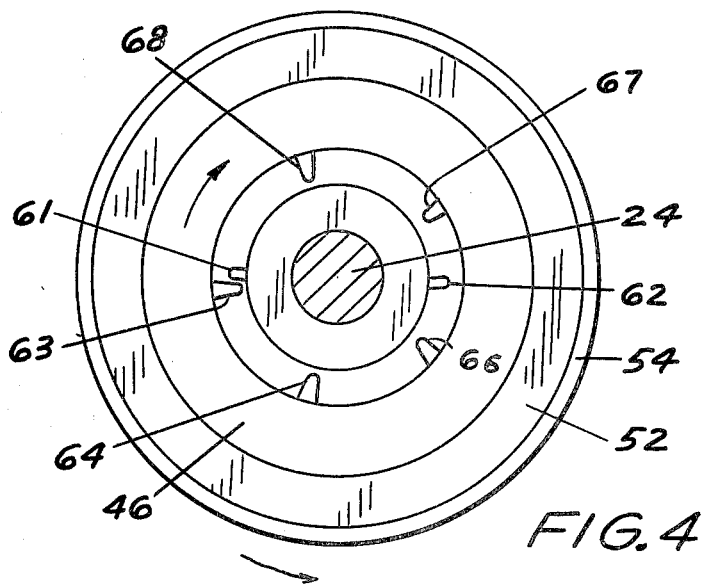

APPARATUS FOR CUTTING VEGETATION

BACKGROUND OF THE INVENTION

1. Field of the invention

This invention relates to the cutting of vegetation, and more particularly, it relates to the cutting of vegetation using a flexible, non-metallic cutting line extending from a rotating head into a cutting plane.

2. Description of prior art

Various types of devices have been proposed for many years to facilitate the removal of vegetation by mowing, trimming, edging and like operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer-edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, and 3,859,776. These patented devices have met outstanding success in the worldwide marketplace. One reason for this success is that these American developments are probably the safest electrical or gasoline-powered tools yet invented for vegetation cutting, edging and trimming operations.

The devices shown in these patents employ a flexible cutting line, such as manufactured from Nylon ® polymer. The cutting line is carried upon a spool internally of a rotating head. When desired to replenish the line or to extend an additional length of it, the rotation of the head was stopped and line manually extended from the head by either (1) uncoiling directly from the head; or (2) unlocking an internal spool, pulling the line from the head to the desired length and releasing the locking mechanism so that the spool was again secured against rotation in the head. These structures in the patented devices have been found to be convenient, simple and reliable. In many of the smaller devices, especially those powered by electric motors, a simpler system to extend the cutting line from the head was desired. The present invention is a device for cutting vegetation in the nature of the patented devices, wherein a simple but reliable mechanism is employed for extending selectively the cutting line in a certain length from the head. More particularly, this novel device or apparatus is simple to operate and has no complicated mechanisms. A button member on the head is depressed when the head is in a non-rotating condition. Then, the line can be pulled from an internal spool released for rotation in the head, until a certain length is withdrawn. Now, the spool is re-locked to the head. The line may be pulled manually by the user from the head. Alternatively, the head can be rotated to pull the line from the head by centrifugal force. Other features of the present invention will be apparent from the following description.

SUMMARY OF THE INVENTION

In accordance with this invention, there is provided an apparatus for cutting vegetation which has a planar head rotatable about an axis of rotation and a drive connection extending from a first face. A second face on the head has a smooth convex surface free of projections and recesses which are capable of trapping appreciable vegetation. A spool is carried by the head and is mounted for rotation independently thereof. A flexible, non-metallic cutting line is coiled about the spool and has a free end extending outwardly of the head into a cutting plane. A circular button member conforms to the smooth convex surface and it is mounted for manually-induced axial movement to an inward station from an outward station in the head. The button is biased to the outward station. A locking means on the head is adapted to be activated by the button member in the inward station for releasing the spool for rotation within the head. Rotation of the head induces independent spool rotation through a pre-determined angular displacement for extending a certain length of cutting line from the head into the cutting plane. At this occurrence, the locking means secures the spool against rotation relative to the head.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

FIG. 3 is a vertical section, in enlargement, taken through the head of the apparatus shown in FIG. 2;

FIG. 4 is a horizontal cross-section of the head shown in FIG. 3 taken along line 4—4; and FIG. 5 is the section of FIG. 3, but with the actuating member depressed inwardly to extended cutting line from the head.

DESCRIPTION OF SPECIFIC EMBODIMENTS

Referring to FIG. 1, there is shown an apparatus for cutting vegetation, which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a rotatable head 19 from which extends at least one length of a flexible, non-metallic cutting line 21. Rotation of the head 19 about an axis passing through the housing 12 extends the cutting line 21 into a cutting plane which is substantially perpendicular to the axis of rotation of the head.

In FIG. 2, there is shown an enlargement of the housing 12 with a portion of the tubing 13 carrying a plurality of air induction openings 22. These openings introduce a flow of cooling air over the prime mover contained in the housing 12. In the particular embodiment being described, the housing 12 includes an electric motor 23 which has a downwardly extending drive shaft 24. The head 19 is threadedly connected to the shaft 24 by a metal adaptor 26. The adaptor 26 extends from the upper face of the head 19 surrounded by a plurality of vanes 27 serving as a centrifugal blower for moving air radially outwardly from the head 19 during its rotation. As a result, the induced flow of air cools the motor 23 within the housing 12. The head 19 is formed of a hub 42 and a lower cover or glide ball 52. The ball 52 is secured to the hub 42 in any convenient fashion. The hub 42 carries in its side peripheral surface 30 an aperture 31 through which the cutting line 21 extends radially outwardly.

The housing 12 includes a rearwardly extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly extending projection 33 in which is embedded a metal cutting blade 34. As a result, the cutting line 21 rotated by the head 19 can never have an operating length greater than the distance from the axis of rotation to the cutting blade 34, since any greater length will automatically be severed.

The head 19, as seen in FIG. 3., is disc-like with a smooth peripheral side surface 30 which has the aperture 31 through which the cutting line 21 extends. Also, a metal curvilinear bearing surface 41 covers the leading and trailing edges of the aperture 31. The head 19 includes the hub 42 carrying integrally formed vanes 27. The hub carries the adapter 26 in which the drive shaft 24 is threaded. In addition, the adapter 26 extends axially through the head 19 to form a convenient stud 43 for securing the various elements together. The interior of the hub 42 is formed into a cylindrical opening 44 in which is disposed a spool 46. The spool is mounted for independent rotation relative to the head 19. For this purpose, a cylindrical interior wall surface 47 of the spool is journaled on a post 48 about the stud 43. The spool 46 has the spaced-apart circular flanges 53 and 57 aligned in parallel and mounted upon a tubular reel body in which is formed the cylindrical interior wall surface 47. Preferably, the post 48 is threaded upon the stud 43 so as to be integrally connected to the hub 42. A supply of the cutting line 21 is coiled upon the spool 46 in several layers 49. The interior end of the coiled cutting line 21 is secured to the spool 46. The other end of the cutting line 21 extends outwardly through the aperture 31.

The exposed surface 51 of the head 19 is of convex configuration and is smooth in contour, without substantial projections and recesses capable of trapping appreciable vegetation. Preferably, the surface 51 is coaxially aligned with the axis of rotation of the head 19. Stated in another manner, all parts of the surface 51 are unbroken in the line of travel during rotation of the head 19. However, this surface may be curved or multiplanar on a radial line extending across the head. In this manner, the surface 51 will travel freely through the vegetation being cut, without appreciable loading of the electric motor 23.

As shown in FIG. 3, the surface 51 is formed upon a glide ball 52 which is secured to the spool 46 at the periphery of reel flange 53. For example, after the head 19 is assembled, the glide ball 52 could be thermally welded to the spool 46. Alternatively, contact adhesive 54 can be employed for this purpose.

More particularly, the head 19 is assembled by mounting the spool 46 about the post 48. Then, a metal washer 56 is installed about the stud 43. A nut 57 threads on the stud 43 to hold the washer 56 against the outward surface of the post 48. At this time, the glide ball 52 is secured to the flange 53 of the spool 46.

A spring 55 is contained between the interior reel flange 57 of the spool 46 and an annular recess 58 formed within the hub 42. With this arrangement, the spool 46 and glide ball 52 are urged axially from the hub 42 into an outward station in the head 19.

Locking elements are provided on the head 19 so that when the glide ball 52 is in the outward station, the spool 46 is secured to the head 19. As a result, the cutting line 21 cannot be withdrawn from the spool 46, either manually or by centrifugal forces arising from rotation of the head 19. Various forms of locking structures may be employed for this purpose, such as an arrangement of toothed projections or recesses in the nature of an escapement. A plurality of pins and teeth form a preferred escapement. For example, the post 48 carries a pair of diametrically-spaced metal pins 61 and 62. The pins 61 and 62 are radially opposite one another on the post 48 but at different horizons relative to the axis of rotation of the head 19. The spool 46 carries a plurality of inwardly facing teeth 63, 64, 66, 67 and 68 at a uniformly angular spacing about the interior wall surface 47.

This pin and teeth arrangement can be seen more clearly by reference to FIG. 4. With the glide ball 52 in the outward station, the pin 61 is in abutment with the tooth 63 and prevents the spool 46 from rotating clockwise relative to the head 19 responsive to pull of the cutting line. With the glide ball 52 moved axially to its inward station into the head 19, the spool 46 is released for rotation a prescribed angular disposition relative to the head 19. Under these conditions, the spool 46 rotates until the next adjacent tooth of the spool (in the clockwise direction of its rotation) engages the pin 62. As illustrated in FIG. 4, the tooth 67 engages the pin 62 and secures the spool from further rotation in the head. This arrangement is shown in FIG. 5 wherein the tooth 67 is in abutment with the pin 62. However, the pin 61 is clear of the teeth on the flange 53 of the spool 46. Now, the glide ball 52 is released and the spring 53 returns the glide ball 52 to its outward station. At this time, the spool 46 rotates clockwise the same predetermined angular movement as before until the tooth 64 on the spool 46 engages the pin 61. The spool 46 is again secured to the head 19 against further rotation. As a result, the spool 46 has been rotated a predetermined angular displacement relative to the head with the glide ball moving from the outward station to the inward station, and back again to the outward station. As a result, a certain length of cutting line 19 has been extended from the head 19.

The locking mechanism of the present apparatus may be activated by (1) stopping the rotation of the head 19, (2) manually moving the glide ball 52 to the inward position, (3) pulling upon the cutting line 21, and (4) releasing the glide ball 52 to allow the spool to complete its rotation while yet pulling upon the cutting line 21. Preferably, the operation is performed by the operator pressing the glide ball 52 onto the earth's surface whereby the glide ball 52 moves to its inward station, and with the electric motor 23 rotating the head 19 relative to the spool 46. Upon rotation of the head 19, the operator may raise the head 19 slightly to remove contact of the glide ball 52 with the earth's surface. Usually, the head rotation with torque and friction effects causes the movement away from the earth's surface of the glide ball 52. As a result, the extension of the cutting line 21 is completed very simply and automatically by the novel structure employed in the trimmer 11.

The axial spacing of the pins 61 and 62 at different horizons on the post 48 is correlated to the spacings of the teeth carried upon the spool 46 and the distance the glide ball 52 moves between inward and outward stations. Preferably, the spacings are such that as one tooth comes out of engagement with the pin 61, another tooth comes into alignment to engage the pin 62. As a result, the spool 46 cannot "free-wheel" about the post 48, either by a manual pull upon the cutting line 21 or as a result of centrifugal force from rotation of the head 19. Preferably, the engaging surfaces between the teeth and the pins are sufficient in contact area so that the teeth and pins cannot be moved axially out of engagement by any casual or unintended pressing of the glide ball 52 against the earth's surface. As a result, the cutting line cannot be unintentionally extended from the head 19 by the use of the trimmer 11.

Although the head 19 may be formed of metal, plastic or other material, it is preferred to use rather inexpensive polymeric materials which are readily fabricated by high speed molding operations. The spool 46 can carry sufficient cutting line 29 (e.g., 0.065–0.100 inch in diameter Nylon ® polymer) for several years vegetation cutting before requiring a new supply of cutting line. When desired, the head is readily unsecured from the drive shaft 24 and replaced with a head containing a fresh supply of the cutting line 21. If desired, the glide ball 52 is treated to release adhesive 54 from the flange 46; then, the head is disassembled and fresh cutting line wound upon the spool 46. Alternatively, the spool can be rewound with a fresh supply of cutting line by merely inserting the free end of the cutting line into a hole 71 in the spool 46. Then, the head 19 is rotated counter-directionally to its normal turning direction to the spool with the glide ball moved between its stations. As a result, the cutting line 21 is wound upon the spool 46.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:
1. An apparatus for cutting vegetation, comprising:
   (a) a head rotatable about an axis of rotation with a drive connection extending from a first face and a second face having a smooth convex surface free of projections and recesses capable of trapping appreciable vegetation and said head having an open-ended cylindrical cavity coaxial with the rotational axis;
   (b) a spool carried by said head and mounted for rotation independently thereof within said cavity, and said spool comprised of two spaced-apart circular flanges aligned in parallel and mounted upon a tubular reel body having a cylindrical interior wall surface with open ends;
   (c) a cylindrical post member mounted coaxially within said cavity on said head, and provided with bearing means to journal said spool for rotation about said post member and adapted for axial movement thereon between an outward station and an inward station;
   (d) resilient means biasing said spool into the outward station;
   (e) a flexible, non-metallic cutting line coiled on said spool and having a free end extending outwardly of said head through aperture means into a cutting plane;
   (f) a circular glide ball member conforming to the smooth convex surface and mounted on said spool concentrically with the rotational axis for enclosing one open end of said spool; and
   (g) locking means on said spool and post member, said locking means adapted to be activated by said glide ball member moving said spool between the outward and the inward stations for releasing said spool for rotation within said head responsive to pull of the free end of said cutting line, said locking means including a plurality of inwardly-facing radially-aligned teeth carried by said spool upon the cylindrical interior wall surface and a plurality of outwardly-facing radially-aligned pins carried on said post member, and said teeth and pins cooperating in angular and axial spaced relationships for regulating spool rotation through a predetermined angular displacement for extending a certain length of cutting line from said head into the cutting plane when said spool moves between said inward and outward stations whereat said locking means with said spool at the outward station on said post member securing said spool against rotation relative to said head.

2. The apparatus of claim 1 wherein said glide ball member extends substantially coextensively of the convex smooth surface of said spool and is integral therewith.

3. The apparatus of claim 1 wherein said glide ball member has a rounded surface adapted to engage vegetation-covered earth's surface for manual displacement from the outward station to the inward station.

4. The apparatus of claim 3 wherein said glide ball member has a low-friction smooth surface relative to vegetation whereby said head can be rotated in contact with vegetation without excessive torque requirements.

5. An apparatus for cutting vegetation, comprising:
   (a) a head rotatable about an axis of rotation with a drive connection extending from a first face and a second face having a smooth convex surface free of projections and recesses capable of trapping appreciable vegetation and said head having an open-ended cylindrical cavity coaxial with the rotational axis;
   (b) a spool carried by said head and mounted for rotation independently thereof within said cavity, and said spool comprised of two spaced-apart circular flanges aligned in parallel and mounted upon a tubular reel body having a cylindrical interior wall surface with open ends;
   (c) a cylindrical post member mounted coaxially within said cavity on said head, and provided with bearing means to journal said spool for rotation about said post member and adapted for axial movement thereon between an outward station and an inward station;
   (d) resilient means biasing said spool into the outward station;
   (e) a flexible, non-metallic cutting line coiled on said spool and having a free end extending outwardly of said head through aperture means into a cutting plane;

(f) a circular glide ball member conforming to the smooth convex surface and integrally mounted on said spool concentrically with the rotational axis for enclosing one open end of said spool; and (g) a plurality of inwardly-facing teeth carried at uniform angular spacings upon the cylindrical interior wall surface of said spool;

(h) a plurality of outwardly-facing pins carried by said post member, said pins residing at different horizons relative to the axis of rotation and in radially opposite positions on said post member; and (i) said teeth on said spool engaging some of said pins at one horizon on said post member when said spool is at the outward station and said teeth on said spool engaging other of said pins at another horizon on said post member when said spool is at the inward station, whereby said teeth and pins cooperate at the inward station for regulating spool rotation through a predetermined angular displacement for extending a certain length of cutting line from said head into the cutting plane, whereat said spool at the outward station is locked on said post member for securing said spool against rotation relative to said head.

* * * * *